United States Patent [19] — [11] 4,233,167

Sramek — [45] Nov. 11, 1980

[54] LIQUID DETERGENT SOFTENING AND BRIGHTENING COMPOSITION

[75] Inventor: John A. Sramek, Racine, Wis.

[73] Assignee: S. C. Johnson & Son, Inc., Racine, Wis.

[21] Appl. No.: 48,411

[22] Filed: Jun. 14, 1979

[51] Int. Cl.[2] ...................... C09K 11/06; C11D 1/835; C11D 3/42; D06M 13/46

[52] U.S. Cl. .................................. 252/8.75; 252/8.8; 252/117; 252/153; 252/173; 252/301.23; 252/524; 252/528; 252/543; 252/547; 252/DIG. 14

[58] Field of Search ................ 252/8.75, 8.8 R, 8.8 Q, 252/110, 117, 153, 173, 524, 528, 543, 547, 301.23

[56] References Cited

U.S. PATENT DOCUMENTS

| | | | |
|---|---|---|---|
| 3,025,242 | 3/1962 | Seyler | 252/301.23 |
| 3,211,665 | 10/1965 | Allen | 252/301.23 |
| 3,360,470 | 12/1967 | Wixon | 252/99 |
| 3,406,118 | 10/1968 | Tscharner | 252/301.23 |
| 3,479,349 | 11/1969 | Allison | 252/301.23 |
| 3,537,993 | 11/1970 | Coward | 252/8.75 |
| 3,589,921 | 6/1971 | Allison | 106/137 |
| 3,676,339 | 7/1972 | Tscharner | 252/8.75 |
| 3,728,275 | 4/1973 | Horlacher | 252/301.23 |
| 3,997,453 | 12/1976 | Wixon | 252/8.75 |
| 4,025,507 | 5/1977 | Fleck | 252/301.23 |

OTHER PUBLICATIONS

Stensby, P. S.: "Optical Brighteners and Their Evaluation" A Reprint of a series of articles published in *Soap & Chemical Specialties*, Apr., May, Jul., Aug. & Sep., 1967, 28 pages.

*Primary Examiner*—Dennis L. Albrecht

[57] ABSTRACT

A stable, liquid detergent softening and brightening composition or concentrate contains a water-soluble non-ionic surfactant system; a quaternary ammonium softener having an equivalent weight from about 400 to 2000; at least an equivalent weight to said softener of a 4,4'-bis[4-disubstituted amino-6-(sulfosubstituted anilino)-s-triazin-2-ylamino]-2,2'-stilbene disulfonic acid optical brightener; a hydrotrope to stabilize the composition and an aqueous solvent medium therefor. The composition is storage stable and provides enhanced cling-free softening and brightening without loss of cleansing properties or yellowing of fabrics.

5 Claims, No Drawings

LIQUID DETERGENT SOFTENING AND BRIGHTENING COMPOSITION

BACKGROUND OF THE INVENTION

1. Field of the Invention

This invention relates to an improved liquid detergent having added softener and brightener for use in laundering fabrics. In particular, it relates to a storage stable, single-phase laundry detergent-softener-brightener composition free from phosphates and possessing enhanced softening and brightening properties.

2. Description of the Prior Art

In the recent past, laundry was washed by simply placing it in a machine filled with detergent, running the machine through a wash cycle and then through a rinse cycle.

Later, cationic fabric softeners were added to the rinse cycle to improve the feel of the laundry and reduce the static charges built up on fabrics during drying. These cationic fabric softeners were not blended with liquid detergents, since they became unstable in the presence of the detergents and tended to form distinct phases during storage. The softeners were not successfully employed in the wash cycle, since they tended to deposit on the clothing as a yellow film. This film also tended to coat fabrics with a water-repellent finish after repeated use. In fabrics, particularly those which needed to breathe or absorb water, this was a serious defect. Fine fabrics were recognized to be particularly susceptible to yellowing, clinging and filming from detergent washing with softening treatment.

In an attempt to correct these defects, anionic detergents and phosphate builders were added to detergents to complex the softeners and prevent their yellowing and filming of fabrics. However, these attempts proved unsuccessful, since the softening effect of the fabric softeners, notably the quaternary ammonium salts of "quats", was seriously reduced. In addition, it has been recognized, recently, that phosphates can adversely effect the ecology. Consequently, there has been much clamor for detergents, which are free from phosphates.

Modern fabrics, including nylons, polyesters, cotton and blends thereof and particularly fine fabrics, are expected to be bright in appearance after washing. Commonly used detergent fluorescent brighteners, such as DASC brighteners (DASC-ASTM designation—those derived from diaminostilbene disulfonic acid-cyanuric chloride) have two sulfonic acid groups per molecule. These brighteners have been suggested for use with detergents and softeners. However the disulfonate brighteners tend to form unstable opaque products with very poor brightening properties, when combined with laundry detergents and cationic softeners. Monosulfonate, NTS-type stilbenesulfonic acid brighteners have been proposed, but provide very poor brightening when employed with detergents and softeners. Diaminostilbene hexa-sulfonate brighteners are used in coatings in the paper industry, but are not recommended for use as brighteners with standard detergents owing to their high level of water solubility. Such hexa-sulfonate brighteners and cationic softeners. Monosulfonate, NTS-type stilbenesulfonic acid brighteners have been proposed, but provide very poor brightening when employed with detergents include those disclosed in British Pat. No. 941,993 which utilize detergents and DASC brighteners, but no fabric softeners. These compositions are merely powder mixtures, not liquid compositions.

In U.S. Pat. No. 3,625,891, a blend of three different quaternary ammonium ("quats") fabric softeners were employed to overcome detergent compatibility problems. The softener and detergent were added separately to the wash.

In U.S. Pat. No. 3,644,203 a minor amount of anionic surfactant was employed with a cationic fabric softener together with a nonionic surfactant and a conventional phosphate builder, forming a multifunctional detergent, in which the anionic surfactant served to neutralize the cationic softener. Optical brighteners were optionally disclosed, but not those employed in this invention.

A nonphosphate softener-detergent composition is set forth in U.S. Pat. No. 3,959,157. A DASC brightener is employed having only two sulfonate groups. To stabilize the "quat" softeners, up to 20% of an alcohol is disclosed to be necessary. This adds to the expense of the composition. Further, the level of "quat" softeners employed in the patent is from about 3% to 15% by weight of the composition. It is most desirable to reduce this level, while maintaining softening properties, to reduce the costs of the product to the consumer and reduce yellowing and filming tendencies.

SUMMARY OF THE INVENTION

It is, therefore, an object of the present invention to provide a storage stable, liquid detergent composition having softening and brightening properties which permits a single-step laundering, softening and brightening treatment.

It is another object of the invention to provide a stable, single phase liquid laundering composition providing balanced cleansing, softening and brightening with a capacity to resist static cling, filming and yellowing of fabrics.

It is a further object to provide an economical, clear detergent composition for fine fabrics with balanced softening and brightening.

It is yet an additional object to provide an easily pourable, storage stable, phosphate-free, detergent-softener aqueous composition which will not impart a water-repellent finish to fabrics.

Other objects and advantages will be apparent to those skilled in the art from the description provided hereinafter.

The above and other objects are met in an aqueous, stable liquid detergent composition having enhanced softening and brightening properties comprising:

(a) a water soluble non-ionic surfactant system in amounts from about 10 to 50% by weight, (b) at least one quaternary ammonium fabric softener having an equivalent weight from about 400 to 2000, in amounts from about 0.75 to 6% by weight, of the formula:

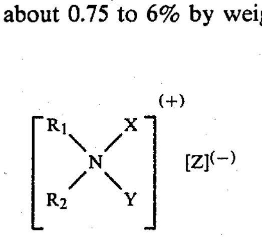

wherein Z is a water soluble, salt-forming anion, $R_1$ is a $C_{10}$–$C_{20}$ alkyl radical, $R_2$ is R' or a $C_{10}$–$C_{20}$ alkyl radical, X and Y are the same or different and are methyl, ethyl, 2-hydroxyethyl, 2-hydroxy propyl, $-(R')-C-C-O-H$, or

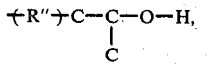

wherein R″ is a polymer having from 1 to 10 ethoxy, isopropoxy or mixed ethoxy-isopropoxy units, and R′ is polyethoxy ethanol having from 1 to 10 ethoxy units only when:

(i) X and Y are both methyl, or (ii) X is methyl and Y is polyethoxyethanol having from 1 to 10 ethoxy units, (iii) X is ethyl and Y is polyethoxy ethanol having from 1 to 10 ethoxy units;

(c) an optical brightener of the formula:

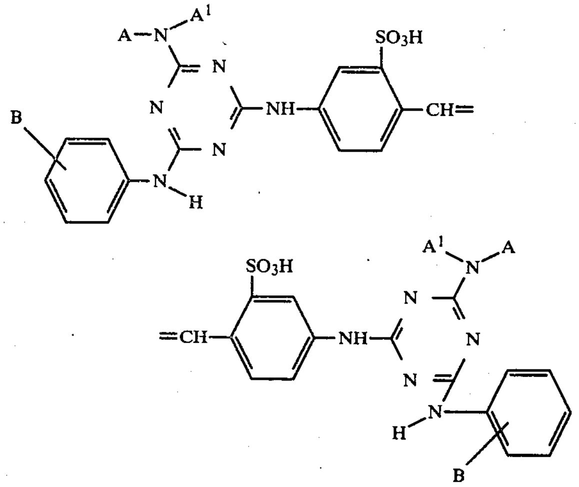

wherein A and $A^1$ are the same or different and are hydrogen, methyl, ethyl, isopropyl, 2-hydroxyethyl, propanamido or taken together are morpholino or anilino; B is H, m-$SO_3H$, or p-$SO_3H$, wherein the total number of $-SO_3H$ groups is from 3 to 5, and the salts having water soluble anions thereof, wherein the equivalent weight ratio of (b) to (c) is from about ½:1 to 1:1, wherein the weights are based on the total weight of the aqueous composition;

(d) a hydrotrope is sufficient amounts to maintain a stable composition; and (e) an aqueous solvent medium.

When the term "brightening" is employed herein it is meant to include both the whitening of fabrics and the optical brightening of fabrics as these conventional terms are understood by those skilled in the art.

As employed herein the term "nonionic surfactant system" includes a single nonionic surfactant or detergent or a blend of nonionic surfactants (or detergents).

For the purpose of this invention the term "hydrotrope" is employed in its art-recognized context and includes a substance which increases the solubility of a compound in aqueous solution.

An important feature of the invention is the use of a specified quaternary ammonium compound having an equivalent weight between about 400 and 2000 in combination with the diamino distilbene optical brighteners having 3 to 5, and particularly 4, sulfonate groups in an equivalent weight ratio of quaternary softener to optical brightener of ½:1 to 1:1. It has been found that both brightening and, unexpectedly, softening are enhanced, when an equivalent weight or greater of brightener is employed as compared to softener.

It has been postulated that the cationic quaternary ammonium compound and anionic optical brightener interact to form a complex based on charge attraction and neutralization. When the equivalent weight of brightener necessary to provide sufficient negative charges attributable to sulfonates is equal to or about twice the equivalent weight of quaternary softener necessary to provide sufficient positive charge attributable to ionized nitrogen to create a charge complex, then enhanced brightening and softening are obtained. This effect is unexpected, since one skilled in this art would expect softening to be reduced as the amount of quaternary softener in the formulation is reduced.

DESCRIPTION OF PREFERRED EMBODIMENTS

The nonionic surfactant system includes commercially known compounds. These include the water-soluble products which are derived from the condensation of an alkylene oxide or equivalent reactant and a reactive-hydrogen hydrophobe. The hydrophobic organic compounds may be aliphatic, aromatic or heterocyclic, although the first two classes are preferred. The preferred types of hydrophobes are higher aliphatic alcohols and alkyl phenols, although others may be used such as carboxylic acids, carboxamides, mercaptans, sulphonamides, and the like. The ethylene oxide condensates with higher-alkyl phenols represent a preferred class of nonionic compounds. Usually the hydrophobic moiety contains at least about 6 carbon atoms, and preferably about 15 carbon atoms, and may contain as many as about 50 carbon atoms or more. The amount of alkylene oxide will vary considerably depending upon the hydrophobe, but as a general guide and rule, at least about 5 moles of alkylene oxide per mole of hydrophobe should be used. The upper limit of alkylene oxide will vary, also. While ethylene oxide is the preferred and predominating oxyalkylating reagent, other lower alkylene oxides such as propylene oxide, butylene oxide, and the like may also be used or substituted in part for the ethylene oxide. The preferred hydrophilic moiety contains no more than about 9 moles (average) of ethylene oxide, although greater amounts may sometimes be employed.

Other nonionic compounds which are suitable are the polyoxyalkylene esters of the organic acids, such as the higher fatty acids, the rosin acids, tall oil acids, acids from petroleum oxidation products, and the like. These esters will usually contain from about 10 to about 22 carbon atoms in the acid moiety and from about 8 to about 30 moles of ethylene oxide or its equivalent.

Still other nonionic surfactants are the alkylene oxide condensates with the higher fatty acid amides. The fatty acid group will generally contain from about 8 to about 22 carbon atoms and this will be condensed with about 10 to about 50 moles of ethylene oxide. The corresponding carboxamides and sulphonamides may also be used as substantial equivalents.

A preferred class of nonionic products are the oxyalkylated higher aliphatic alcohols. The fatty alcohols should contain at least 6 carbon atoms, and preferably from 9 to 11 carbon atoms. Useful alcohols include nonyl and decyl alcohols and the said alcohols should be condensed with at least about 5 moles of ethylene oxide and, preferably about 6 to 9 moles of ethylene oxide. A typical nonionic product is decyl alcohol condensed with 8 moles of ethylene oxide. The corresponding alkyl mercaptans when condensed with ethylene oxide are also suitable in the compositions of the present invention.

An amine oxide surfactant may be used with the nonionics. These are also commercially known and comprises a tertiary amine oxide compound characterized as follows:

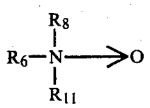

wherein $R_6$ is a higher alkyl radical having from about 12 to 22 carbon atoms, or the 2-hydroxy derivative thereof, and $R_7$ and $R_8$ are each independently methyl, ethyl, propyl, isopropyl, or hydroxyethyl radicals. The arrow designates a semi-polar bond. Amine oxides wherein $R_7$ and $R_8$ are lower alkyl groups and their method of preparation are described in Guenther U.S. Pat. No. 2,169,976. Amine oxides wherein $R_7$ and $R_8$ are hydroxyethyl and their method of preparation are described in Priestley U.S. Pat. No. 3,324,183.

Examples of suitable amine oxides operable within the invention are dimethyl hexadecyl amine oxide, dimethyl octadecyl amine oxide, bis (2-hydroxyethyl) tallow amine oxide and other ethoxylated, isopropoxylated or mixed ethoxylated isoproxylated amine oxides, or the like.

Further, other well known detergents, such as amphoterics, betaines and sulfobetaines may be employed with the nonionics. Mixtures of blends of the aforesaid nonionics are also employed.

In an especially preferred embodiment, the nonionic system is a mixture of an ethylene oxide condensate of an alkyl phenol (a heavy duty detergent) and an ethoxylated $C_9$–$C_{11}$ alcohol (a light duty detergent). The alkyl phenol is preferably nonyl phenol. Employing up to about 8.5 moles of ethylene oxide per mole of nonyl phenol provides most satisfactory cleansing. Above such ethylene oxide levels, cleansing ability is impaired.

The heavy duty detergent provides maximum cleaning for the system, while the light duty detergent aids in controlling viscosity of the composition and in reducing soil redeposition. This blend also minimizes hydrophobic binding to the cationic softener and yields high cloud points to provide a preferred clear liquid composition.

The amount of nonionic(s) employed may vary widely depending upon the specific nature and intended use of the liquid concentrate. The terms concentrate, formulation and composition are used interchangeably herein. In general from about 10% to about 50% by weight of the total composition of nonionic(s) is employed. The preferred range is from about 15 to 30% by weight.

The softener and anti-static agent utilized should have an equivalent weight $$\frac{\text{molecular weight}}{\text{charge/molecule}}$$

from about 400 to 2000 and preferably from about 500 to 1000. Within these parameters and softener will exhibit maximum softening and compatibility with the other ingredients. At lower equivalent weights the softener becomes too soluble to provide the necessary softening.

Low molecular weight impurities normally present in commercial quaternary softeners must also be kept to a minimum. In commercial "quats" trialkyl impurities are typically present in amounts from 3 to 5% by weight. These impurities must be kept as low as possible, preferably less than 0.5%. Other impurities, as noncyclized triamides, must also be kept to minimal amounts. At commercial impurity levels a formulation containing said quats can become hazy and creamy. This is highly undesirable.

The preferred quats are difatty alkyl, disubstituted ammonium quaternaries of the formula:

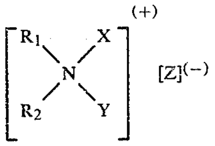

wherein Z is a water soluble, salt-forming anion, $R_1$ is a $C_{10}$–$C_{20}$ alkyl radical, $R_2$ is R' or a $C_{10}$–$C_{20}$ alkyl radical, X and Y are the same or different and are methyl, ethyl, 2-hydroxyethyl, 2-hydroxy propyl, $-(R'')-C-C-O-H$, or

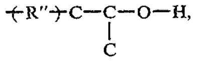

wherein R'' is a polymer having from one to ten ethoxy, isopropoxy or mixed ethoxy-isopropoxy units, and R' is polyethoxy ethanol having from 1 to 10 ethoxy units only when:

(i) X and Y are both methyl, or (ii) X is methyl and Y is polyethoxyethanol having from 1 to 10 ethoxy units, (iii) X is ethyl and Y is polyethoxy ethanol having from 1 to 10 ethoxy units; Z may be halide, sulfate, acetate, methosulfate or similar inorganic solubilizing mono or dibasic radical.

The preferred quat is a dihydrogenated tallow dimethyl ammonium chloride with an average equivalent weight of about 569.

A preferred class of softeners includes the dimethyl dialkyl ($C_{12}$–$C_{18}$) ammonium chlorides, wherein the dialkyl group is derived from hydrogenated tallow, stearic acid or "coco" fatty acids. The term "coco" refers to fatty acid groups formed from coconut fatty acids. Examples of such softening agents include ($C_{12}$–$C_{18}$) dialkyl dimethyl ammonium chloride (Av. eq. wt. 521), distearyl dimethyl ammonium chloride (Av. eq. wt. 583) and the like.

In general the quaternary softeners having equivalent weights below about 400, as well as those softeners containing, in commercial forms, undue quantities of impurities and also those softeners unduly unstable in detergent-brightener formulations, are not employed. Such softeners include dimethyl alkyl benzyl quats; monoalkyl trimethyl quats; monomethyl trialkyl quats; cocotriesters of triethanol amine quaternized with methyl sulfate; complex diquats; certain imidazolinium quats, particularly the ethylene bis imidazolinium (quats) and the amido quats. It may be possible to employ purified forms of these aforesaid quats which are normally commercially available in solutions, pastes or the like containing undue amounts of impurities for the purpose of this invention. Also, low equivalent weight quats may become available in higher equivalent weight derivatives, which could be employed herein. Either imidazolinum quats or amido quats of sufficient purity can be employed, at least in part, for the quats of the invention.

In general from about 0.75 to about 6% by total weight of formulation of softener may be employed. For the preferred softeners and brighteners it has proved most desirable, to achieve enhanced softening and whitening of fabrics, to provide between about 2.2 to 3% by weight of softener.

The identity of the optical brightener is of substantial importance to the present invention. The fluorescent whitening agents utilized herebefore in the soap and detergent field include the "C"; "DASC," "DSBP," "NTS" and "P-type" (ASTM designations). However enhanced brightening has been provided together with more stable formulations when the optical brighteners are employed of the following formula:

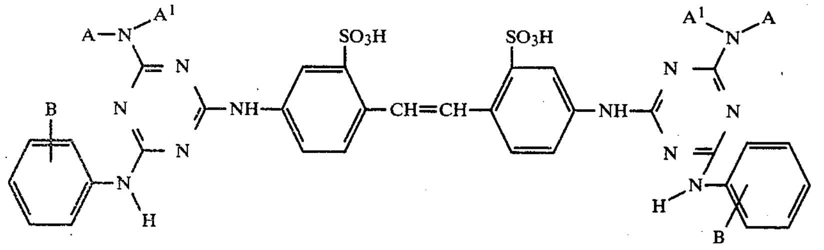

wherein A and $A^1$ are the same or different and are hydrogen, methyl, ethyl, isopropyl, 2-hydroxyethyl, propanamido or taken together are morpholino or anilino; B is H, m-$SO_3H$ or p-$SO_3H$ wherein the total number of —$SO_3H$ groups is from 3 to 5 and the salts thereof having water soluble anions.

It is preferred to employ brighteners wherein B is p-$SO_3H$ and the total number of —$SO_3H$ groups is 4.

Preferred brighteners are disclosed in U.S. Pat. No. 3,211,655, which is incorporated by reference. A preferred class of brighteners is, therefore, the 4,4'-bis[4-disubstituted amino-6-(p-sulfoanilino)-s-trizin-2-ylamino]-2,2'-stilbene disulfonic acids and the water soluble cation salts thereof. The most preferred brightener is 4,4'-bis[4-diethanolamino-6-(p-sulfonanilino)-s-triazin-2-ylamino]-2,2'-stilbenedisulfonic acid, tetrasodium salt disclosed in U.S. Pat. No. 3,025,242.

While preferred brighteners having 3 to 5 sulfonates can be utilized, the tetrasulfonates have provided enhanced results with the preferred softeners. Brightening and softening are improved, unexpectedly, when the equivalent weight ratio of softener to brightener is from about ½:1 to about 1:1, and particularly from about 0.7:1 to about 0.8:1.

While not desiring to be bound to any particular theory, it is believed that the softener and brightener interact in solution to form a charge complex, resulting from the charge attraction of the ionized sulfonate and quaternary ammonium groups. When about 3% by weight of formulation of the dihydrogenated-tallow dimethyl ammonium chloride softener is employed, and about 1.49% of the preferred diethanolamino-tetrasulfonate brightener is utilized, the equivalent weight ratio of quat softener to brightener is about 1 eq./1 eq. Softener levels above this ratio reduce brightening and enhance undesired yellowing. As the softener level is reduced to about 2.25% (3/4:1), not only does brightening and whitening increase, but, unexpectedly, softening increases. Below this ratio, softening decreases.

In general, the quantity of optical brightener employed will be selected based on the particular softener employed and the amounts thereof employed. Generally from about 0.15% to 6% by weight of brightener is employed. Preferably less than about 2% by weight of brightener is employed. If desired small amounts of other brighteners, as coumarin type brighteners, may be employed. The weight percents are based on the total weight of the formulation.

In order to help control concentrate viscosity, improve whitening and softening and maintain low temperature stability, a hydrotrope is employed in the formulation. Such compounds assist in solubilizing the various formulation ingredients, such as the softener. The hydrotropes may improve the softening imparted to laundry by a counter-ion effect; they are more easily deposited in fabric, than the softener anion to maintain charge neutrality. Typical hydrotropes are lower molecular weight sulfates; disulfated polyethylene oxide; propylene oxide; mixed oxides; and sulfonates and carboxylates. The hydrotropes must not effect the optical brightener-softener interaction.

Preferred hydrotropes are medium chain fatty acid salts, particularly alkali salts, as sodium and potassium salts. In general enhanced results are obtained with $C_8$–$C_{12}$ fatty acid salts.

Particularly enhanced results are obtained when the hydrotrope is a lower molecular weight alkaryl sodium sulfonate. Especially preferred sulfonates are sodium cumene sulfonate, sodium xylene sulfonate and sodium toluene sulfonate.

In general, the hydrotrope is employed at a ratio of at least about one equivalent hydrotrope per equivalent weight of softener employed. Normally, from about 0.5 to about 6% by weight of hydrotrope is employed, based on the total weight of formulation.

The solvent medium for the formulation is aqueous. It may be water alone, or water with additional solvents. Owing to its availability and low cost, water is the preferred major solvent constituent. To aid in controlling viscosity a supplementary solvent, as a lower alkanol, diol or polyol or the like, may be employed. However, such supplemental solvents are usually unnecessary.

Various conventional additives may be employed in conventional amounts to impart additional functional or aesthetic qualities of the liquid formulation. Soil suspending (anti-redep) agents, such as sodium carboxymethylcellulose or polyvinyl alcohol; buffering agents, such as sodium borate or bisulfate; inorganic builders as borax or silicates; bacteriacides; fungicides; dyes; pigments; preservatives and perfumes, all compatible with the balance of the formulation ingredients, may be employed.

Salts, such as sodium or potassium chloride, are useful to assist in viscosity control. The pH of the liquid formulation is normally adjusted to from about pH 6–10 with conventional pH adjusting agents, as sodium carbonate, sodium hydroxide, triethanolamine and potassium hydroxide or the like.

The liquid formulation is prepared by simply admixing the nonionic detergent, the softener and the hydrotrope and heating the mix to about 140° F. Thereafter, the optical brightener and aqueous medium are separately admixed at room temperature and the resulting blend is admixed with the still warm detergent-softener-hydrotrope mix. The resulting formulation is cooled to ambient temperatures of about 70°–80° F. The formulation is storage stable, clear and single-phased. Other methods for preparing the formulation will be apparent to those skilled in this art.

The present liquid formulation is used conventionally. Typically, from about one ounce to about one cup of the present liquid detergent, softener and brightener composition may be employed per wash load, depending upon the water level in the washing machine. The liquid inventive composition is, of course, also useful in the hand washing of laundry. It may sometimes be used undiluted on certain stains or it may be used as a presoak. After conventional washing in a machine containing the present concentrate, the load is rinsed and spun dry for best results.

The present formulation, a liquid concentrate, is storage stable and readily dissolves in warm or cold wash water. The product is attractively clear and maintains its activity and uniformity over a long shelf life.

The formulation is especially useful for cleaning, softening and brightening fine fabrics, while imparting anti-cling properties thereto.

The ingredients of the present liquid concentrate have been described and the recommended amounts of each ingredient have been provided. If the level of nonionic detergent is varied above and below the indicated levels, the cleaning level of the formulation will be raised and lowered, concomitantly. Likewise, if the level of softener is raised or lowered, softening, anti-static properties and whitening and brightening will be affected. However, if the brightener level is not sympathetically adjusted, then as the softener level is varied, yellowing, loss of rewettability and brightener greening may become serious problems.

A stoichiometric equivalent charge to charge equality between the softener and brightener (or less) is maintained for best results. Otherwise expressed, a net free cationic charge of softener (quat) to net free anionic charge of brightener should be from ½:1 to 1:1. If the hydrotrope level is reduced, the viscosity and low temperature clarity of the formulation may be impaired.

If need be, greater quantities of softener than otherwise preferred can be employed, if an anionic detergent is added to counterbalance the excess net free charge of softener.

The following examples illustrate certain preferred embodiments of the present invention.

EXAMPLE I

A liquid detergent-softener-brightener concentrate was prepared by (1) mixing and (2) heating to 140° F., the below-identified nonionic surfactants, quaternary ammonium softener and hydrotrope and (3) adding to the heated mix a solution of optical brighteners and adjuvants premixed at room temperature. The resulting formulation is cooled to room temperature to form (4) a storage stable, single phase, clear, readily pourable concentrate. The concentrate formed had the following ingredients:

| Nonionic Detergents | Weight Percent |
|---|---|
| (1) Nonylphenoxy poly(ethyleneoxy) ethanol (8.5 moles ethylene oxide groups av./mole phenol) | 18.0 |
| (2) Polyethoxylated $C_9$–$C_{11}$ alcohol, (8 moles ethylene oxide/mole alcohol) | 6.5 |
| Softener | |
| dimethyl dihydrogenated tallow ammonium chloride (av. M.W. 569- Pensky-Martens flash point - 115° F.) —(high purity 75% solution) | 3.2 |
| Optical Brightener | |
| 4,4'-bis[4-diethanolamino-6-(p-sulfoanilino)-s-triazin-2-ylamino]-2,2'-stilbene-disulfonic acid, tetrasodium salt (16%) solution | 9.3 |
| Hydrotropic Agent | |
| sodium cumene sulfonate (40% solution) | 10.0 |
| Perfume | 0.5 |
| Blue dye - Xylene Cyanol FF | 0.0006 |
| Violet dye - Brilliant Alizarine Milling Violet FBL | 0.005 |
| Deionized water | 52.4944 |
| | 100.0000 |

The above formulation is added to the wash cycle of an automatic washer at a level of 3 ounces. The washer contains a load of clothes, including two bath towels. The towels and load are washed three times and compared to towels washed in ERA brand liquid detergent. The towels washed in the instant formulation are significantly softer. The weight percents are based on the total weight of formulation.

EXAMPLE II

Four formulations were prepared according to the procedure of Example I. Formulation A is identical to the formulation of Example I, except that the softener level is 4% by weight. [or one equivalent-softener per equivalent-brightener (1:1)]. Formulation B is identical to the formulation of Example I, except that the softener level is 3.5% by weight or 0.875 equivalents softener per equivalent brightener. Formulation C is identical to the formulation of Example I and provides 0.8 equivalents softener per equivalent brightener.

Formulation D is identical to Formulation A except that the nonionic detergent is nonylphenoxy poly(ethoxylated) ethanol having 10.5 moles ethylene oxide at an addition level of 14% by weight and the polyethoxylated alkanol of Example I is at an addition level of 10.5% by weight, instead of 6.5%.

The formulations A-D were individually tested for cleaning ability, whiteness and softness according to a conventional one-cycle-cleaning test; the five-cycle whiteness test and the five-cycle softness test. ERA brand liquid detergent was also tested for cleansing ability. The tests were carried out as follows:

Five-Cycle Whiteness Index—Two four-inch square cotton swatches, free of optical brighteners, were washed for five cycles for each formulation. The whiteness index for the various swatches was then calculated from two readings on a D25M Hunter Refractometer taken at 90° rotation.

Five-Cycle Softness Test—Two towels were washed through five cycles in each of the formulations, then machine dried and allowed to hang over night at ambient conditions to equilibrate before evaluation. A panel of 5 evaluators ranked the towels from softest to hardest. Each test was then duplicated and the data processed for mean and standard deviation.

In the whiteness test, the higher the test value, the whiter the wash. In the softness test the lower the test value, the softer the wash. In the one cycle cleaning test for particulates and sebum, the higher the value, the cleaner the wash.

| Formulation | 5 Cycle Whiteness Index | 5 Cycle Softness | 1 Cycle Cleaning |
|---|---|---|---|
| A | 113.84 | 3.1 (±1.2) | 20 |
| B | 116.52 | 2.4 (±1.1) | Not tested |
| C | 118.42 | 1.5 (±0.7) | 20.5 |
| D | 110.71 | 3.5 (±1.4) | 17.9 |
| ERA Brand Detergent | Not tested | Not tested | 16.5 |

From the test results it is apparent that as softener concentration is reduced below 1 equivalent softener/equivalent brightener, unexpected softness and whiteness is obtained, while cleansing ability is enhanced also. The concentrate of Example I (c) provided best results, overall.

EXAMPLE III

The formulation of Example I was compared to BOUNCE and RAIN BARREL brand wash softeners.

A three cycle softness test was carried out as follows:

Four white bath towels were used for each formulation. All towels were desized prior to the test by three repeated washings, the first two with a commercial detergent and the third with plain water, all at 120° F., followed by sixty minutes of tumble drying.

The towels were then put through three washing and treatment cycles and tumbled dry for 60 minutes (the towels treated with BOUNCE were treated by tumble drying for 60 minutes after each wash. The towels were then evaluated on a scale of 1 (coarse) to 37 (soft).

The results are presented in Table A.

TABLE A

| Softener | Test Score |
|---|---|
| No treatment | 8.0 |
| Formulation D (Example II) | 16.6 |
| BOUNCE | 18.7 |
| RAIN BARREL (wash cycle) | 19.0 |
| EXAMPLE I | 23.9 |

The scale range is 1 to 37 with 1 at the very harsh end and 37 at the very soft end. The softest results were obtained with the Example I formulation.

As is apparent from the foregoing examples, the composition and process of the present invention provides a laundry detergent composition which is multi-functional. The present concentrate cleans, softens and brightens garments laundered therewith. Furthermore, said garments retain their rewet properties (capability of absorbing moisture) and exhibit reduced static cling even after numerous launderings. In addition to its use in the machine washing of fabrics, the instant concentrates have been found to be excellent for hand washing of colored and synthetic garments. Other advantages of the present invention include (1) the reduction of wrinkling of easy care (wash and wear) garments; (2) the task of ironing is made easier; and (3) the product can be used together with bleach.

While various preferred embodiments of the present invention have been illustrated by means of specific examples, it is to be understood that the present invention is in no way to be deemed as limited thereto, but should be construed as broadly as all or any equivalents thereof.

Wherefore I claim:

1. An aqueous, stable, liquid detergent composition having enhanced softening and brightening properties comprising:

(a) a water soluble non-ionic surfactant system having a relatively high cloud point in amounts from about 10 to 50% by weight, (b) a quaternary ammonium fabric softener having an equivalent weight from about 400 to 2000 in amounts from about 0.75 to 6% by weight of the formula:

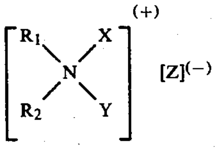

wherein Z is a water soluble, salt-forming anion, $R_1$ is a $C_{10}$-$C_{20}$ alkyl radical, $R_2$ is R' or a $C_{10}$-$C_{20}$ alkyl radical, X and Y are the same or different and are methyl, ethyl, 2-hydroxyethyl, 2-hydroxy propyl, $-(R'')-C-C-O-H$, or

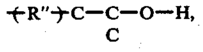

wherein R'' is a polymer having from 1 to 10 ethoxy, isoproxy or mixed ethoxy-isopropoxy units, and R' is polyethoxy ethanol having from 1 to 10 ethoxy units only when:

(i) X and Y are both methyl, or (ii) X is methyl and Y is polyethoxyethanol having from 1 to 10 ethoxy units, (iii) X is ethyl and Y is polyethoxy ethanol having from to 10 ethoxy units;

(c) an optical brightener of the formula:

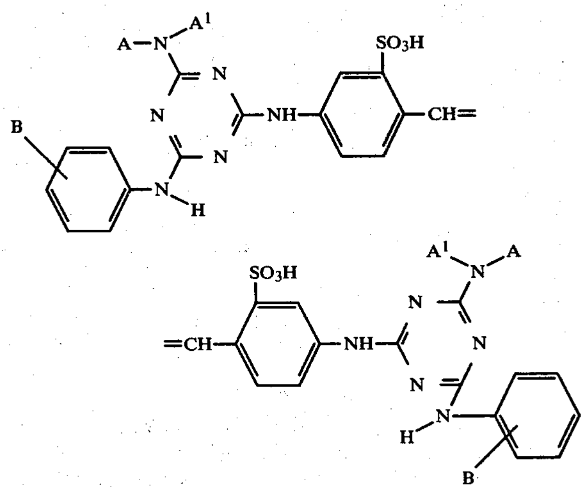

wherein A and $A^1$ are the same or different and are hydrogen, methyl, ethyl, isopropyl, 2-hydroxyethyl, propanamido or taken together are morpholino or anilino; B is H, m-$SO_3H$ or p-$SO_3H$ wherein the total number of —$SO_3H$ groups is from 3 to 5, and the salts thereof having water soluble anions, wherein the equivalent weight ratio of (b) to (c) is from about ½:1 to 1:1, wherein the weights are based on the total weight of the aqueous composition;

(d) a hydrotrope is sufficient amounts to maintain a stable composition; and (e) an aqueous solvent medium wherein said composition has a pH of from 6 to 10.

2. The composition of claim 1 in which (d) is selected from a lower molecular weight alkaryl sodium sulfonate or an alkali salt of a $C_8$–$C_{12}$ fatty acid.

3. The composition of claim 1 in which (a) is a blend of a water soluble ethylene oxide condensate of an alkyl phenol and an ethoxylated $C_9$–$C_{11}$ alkanol.

4. The composition of claim 1 in which (b) is a dimethyl di ($C_{12}$–$C_{18}$) alkyl ammonium salt.

5. The composition of claim 1 in which (c) is a 4,4′-bis[4-diethanolamino-6-(p-sulfoanilino)-s-triazin-2-ylamino]-2,2′stilbenedisulfonic acid or a sodium salt thereof.

* * * * *